United States Patent
Guenter et al.

(10) Patent No.: US 9,727,991 B2
(45) Date of Patent: Aug. 8, 2017

(54) FOVEATED IMAGE RENDERING

(71) Applicant: Microsoft Corporation, Redmond, WA (US)

(72) Inventors: Brian K. Guenter, Redmond, WA (US); Mark Finch, Redmond, WA (US); John Snyder, Redmond, WA (US); Steven Drucker, Bellevue, WA (US); Desney S. Tan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 13/781,763

(22) Filed: Mar. 1, 2013

(65) Prior Publication Data
US 2014/0247277 A1   Sep. 4, 2014

(51) Int. Cl.
G09G 5/00 (2006.01)
G06T 11/40 (2006.01)
G06T 11/00 (2006.01)

(52) U.S. Cl.
CPC .............. *G06T 11/40* (2013.01); *G06T 11/00* (2013.01)

(58) Field of Classification Search
None
See application file for complete search history.

(56) References Cited

U.S. PATENT DOCUMENTS

| | | | |
|---|---|---|---|
| 6,535,644 B1 | 3/2003 | Kurapati | |
| 7,050,068 B1* | 5/2006 | Bastos | G06T 11/001 345/611 |
| 8,094,965 B2 | 1/2012 | Shimizu et al. | |
| 2005/0018911 A1* | 1/2005 | Deever | 382/232 |
| 2006/0033879 A1* | 2/2006 | Covannon et al. | 351/221 |
| 2006/0244760 A1* | 11/2006 | Hunter | G06T 15/04 345/611 |
| 2006/0284986 A1* | 12/2006 | Ahn et al. | 348/211.99 |
| 2007/0291232 A1* | 12/2007 | Marshall | 351/246 |
| 2011/0228110 A1* | 9/2011 | Thorson | 348/207.11 |
| 2013/0007301 A1* | 1/2013 | Jung et al. | 710/5 |
| 2013/0027665 A1* | 1/2013 | Bernert et al. | 351/209 |

OTHER PUBLICATIONS

Zhang et al. (Real-time foveation filtering using nonlinear Mipmap interpolation, 2010).*
Kortum et al. (Implementation of a foveated image coding system for image bandwidth reduction, 1996).*
Jimenez et al. (SMAA: Enhanced Subpixel Morphological Antialiasing, 2012).*

(Continued)

*Primary Examiner* — Kyle Zhai
(74) *Attorney, Agent, or Firm* — International IP Law Group, PLLC (57) ABSTRACT

A method and system for foveated image rendering are provided herein. The method includes tracking a gaze point of a user on a display device and generating a specified number of eccentricity layers based on the gaze point of the user. The method also includes antialiasing the eccentricity layers to remove artifacts, rendering a foveated image based on the eccentricity layers, and displaying the foveated image to the user via the display device.

17 Claims, 8 Drawing Sheets

(56) References Cited

OTHER PUBLICATIONS

Guenter, et al., "Supplement to Foveated 3D Graphics: User Study Details", Retrieved at <<http://research.microsoft.com/pubs/176610/userstudy07.pdf>> In the proceedings of ACM SIGGRAPH Asia, Nov. 20, 2012, pp. 4.
Yu, et al., "Fast rendering of foveated volumes in wavelet-based representation", Retrieved at <<http://www1.i2r.a-star.edu.sg/~zyhuang/review/research/pg05.pdf>> In the proceedings: The Visual Computer—VC, vol. 21, No. 8-10, Sep. 2005, pp. 9.
Basu, et al., "Foveated Online 3D Visualization", Retrieved at <<http://hci.iwr.uni-heidelberg.de/publications/dip/2002/ICPR2002/DATA/11_4_02.PDF, 16th International Conference on Pattern Recognition vol. 3, Aug. 11, 2002, pp. 4.
Colteking (Coltekin), Arzu, "A Visualization Method based on Foveation", Retrieved at <<http://www.geo.uzh.ch/~arzu/publications/ColtekinA_ICC2005.pdf>>, XXII International Cartographic Conference, Jul. 11, 2005, pp. 7.
Bektas, et al., "An Approach to Modeling Spatial Perception for Geovisualization", Retrieved at <<http://www.geo.uzh.ch/~arzu/publications/bektas-coltekin-2011-stgis.pdf>>, International Conference, Sep. 14, 2011, pp. 10.
Farhadi-Niaki, Farzin., "A Review on Eye-Gaze Tracking, GCDs, and Implemented Foveated Imaging Systems Using Optimized Methods -", Retrieved at <<http://www.sce.carleton.ca/~ffniaki/A%20Review%20on%20Eye-Gaze%20Tracking,%20GCDs,%20and%20Implemented%20Foveated%20Imaging%20Systems%20Using%20Optimized%20Methods.pdf>>, Retrieved Date: Nov. 29, 2012, pp. 12.
Baudisch, et al., "Focusing on the Essential: Considering Attention in Display Design", Retrieved at <<http://andrewd.ces.clemson.edu/research/vislab/docs/cacm.pdf>>, In Communications of the ACM, vol. 46, Issue 3, Mar. 2003, pp. 6.
Cheng, Irene., "Foveated 3D Model Simplification", Retrieved at <<http://ieeexplore.ieee.org/stamp/stamp.jsp?tp=&arnumber=1224685>>, In Seventh International Symposium on Signal Processing and Its Applications, Jul. 1, 2003, pp. 4.
Cook, et al., "Distributed Ray Tracing", Retrieved at <<https://www-inst.eecs.berkeley.edu/~cs294-13/fa09/lectures/distribution.pdf>>In ACM SIGGRAPH Computer Graphics, vol. 18, Issue 3, Jul. 1984, pp. 9.
Duchowski, et al., "Foveated Gaze-Contingent Displays for Peripheral LOD management, 3D Visualization, and Stereo Imaging", Retrieved at <<http://www.geo.unizh.ch/~arzu/publications/Duchowski-Coltekin-2007.pdf>>, In Journal of ACM Transactions on Multimedia Computing, Communications, and Applications, vol. 3, Issue 4, Dec. 2007, pp. 18.
Duchowski, Andrew T, "A Breadth-First Survey of Eye Tracking Applications", Retrieved at <<http://andrewd.ces.clemson.edu/research/vislab/docs/BET107cr.pdf>>, In Behavior Research Methods, Instruments, and Computers, Nov. 2002, pp. 16.
Funkhouser, et al., "Adaptive Display Algorithm for Interactive Frame Rates during Visualization of Complex Virtual Environments ", Retrieved at <<http://www.cs.princeton.edu/courses/archive/spring2001/cs598b/papers/funkhouser93.pdf>>, In Proceedings of the 20th Annual Conference on Computer Graphics and Interactive Techniques, Aug. 1993, pp. 8.
Geisler, et al., "Real-time Simulation of Arbitrary Visual Fields", Retrieved at <<http://svi.cps.utexas.edu/ETRA2002.pdf, In Proceedings of the Symposium on Eye Tracking Research & Applications, Mar. 25, 2002, pp. 6.
Guenter, Brian., "Motion Compensated Noise Reduction", Retrieved at <<http://citeseerx.ist.psu.edu/viewdoc/download?doi=10.1.1.37.4407&rep=rep1&type=pdf>>, Microsoft Research TechReport, MSR-TR-94-05, Mar. 1994, pp. 8.
Han, et al., "Frequency Domain Normal Map Filtering", Retrieved at <<http://citeseerx.ist.psu.edu/viewdoc/download?doi=10.1.1.68.2312&rep=rep1&type=pdf>>, In ACM Transactions on Graphics (TOG)—Proceedings of ACM SIGGRAPH, Jul. 2007, pp. 11.
Horvitz, et al., "Perception, Attention, and Resources: A Decision-Theoretic Approach to Graphics Rendering", Retrieved at <<http://uai.sis.pitt.edu/papers/97/p238-horvitz.pdf>>, In Proceedings of the Thirteenth Conference on Uncertainty in Artificial Intelligence, Aug. 1, 1997, pp. 12.
Levoy, et al., "Gaze-directed Volume Rendering", Retrieved at <<https://graphics.stanford.edu/papers/gaze-i3d90/gaze-i3d90-scanned.pdf>> In Technical Report, University of North Carolina, Dec. 1989, pp. 8.
Loschky, et al., "User Performance with Gaze Contingent Multiresolutional Displays", Retrieved at <<http://k-state.co/psych/vcl/applied_research/documents/Loschky_McConkie_ETRA_2000_000.pdf>>, In Proceedings of the Eye Tracking Research & Application Symposium, Nov. 6, 2000, pp. 7.
Luebke, et al., "Perceptually Driven Simplification using Gaze-directed Rendering", Retrieved at <<http://citeseerx.ist.psu.edu/viewdoc/download?doi=10.1.1.38.3600&rep=rep1&type=pdf>>, In University of Virginia Technical Report CS-2000-04, Nov. 27, 2012, pp. 9.
Murphy, et al., "Gaze-Contingent Level of Detail Rendering", Retrieved at <<http://andrewd.ces.clemson.edu/research/vislab/docs/eg2001.pdf>>, In EUROGRAPHICS, Sep. 5, 2001, pp. 10.
Murphy, et al., "Hybrid Image/Model based Gaze-contingent Rendering", Retrieved at <<http://ftp.tuebingen.mpg.de/pub/kyb/roland116-murphy-paper.good.pdf>>, In Proceedings of the 4th Symposium on Applied Perception in Graphics and Visualization, Jul. 2007, pp. 8.
Myszkowski, Karol., "Perception-based Global Illumination, Rendering, and Animation Techniques", Retrieved at <<http://ivizlab.sfu.ca/arya/Papers/ACM/SCCG%2002/Perception-based%20Techniques.pdf>>, In Proceedings of the 18th Spring Conference on Computer Graphics, Apr. 24, 2002, pp. 12.
Nehab, et al., "Accelerating Real-time Shading with Reverse Reprojection Caching", Retrieved at <<http://amddevcentral.com/media/gpu_assets/Nehab-Accelerating_Real-Time_Shading_with_Reverse_Reprojection_Caching(GH07).pdf>>, In Proceedings of the 22nd ACM SIGGRAPH/EUROGRAPHICS Symposium on Graphics Hardware, Aug. 4, 2007, pp. 11.
Ohshima, et al., "Gaze-directed Adaptive Rendering for Interacting with Virtual Space", Retrieved at <<http://ieeexplore.ieee.org/stamp/stamp.jsp?tp=&arnumber=490517>>, In Proceedings of the IEEE Virtual Reality Annual International Symposium, Mar. 30, 1996, pp. 9.
Olano, et al., "Lean Mapping ", Retrieved at <<http://www.csee.umbc.edu/~olano/papers/lean/lean.pdf>>, In Proceedings of the ACM SIGGRAPH Symposium on Interactive 3D Graphics and Games, Feb. 19, 2010, pp. 8.
Ramanarayanan, et al., "Visual Equivalence: Towards a New Standard for Image Fidelity", Retrieved at <<http://www.cs.cornell.edu/~graman/papers/sig07vep/sig07vep.pdf>>, In ACM Transactions on Graphics (TOG)—Proceedings of ACM SIGGRAPH, vol. 26, Issue 3, Jul. 2007, pp. 11.
Reddy, Martin., "Specification and Evaluation of Level of Detail Selection Criteria", Retrieved at <<http://www.ai.sri.com/pubs/files/414.pdf>>, In Virtual Reality vol. 3, Issue 2, Jun. 1998, pp. 23.
Reddy, Martin., "Perceptually Optimized 3D Graphics ", Retrieved at <<http://www.ceng.metu.edu.trt/~e1573963/pdf/00946633.pdf>>, In IEEE Computer Graphics and Applications, vol. 21, Issue 5, Sep. 2001, pp. 8.
Reingold, et al., "Gaze-Contingent Multi-resolutional Displays: An Integrative Review", Retrieved at <<http://krex.k-state.edu/dspace/bitstream/handle/2097/2789/LoschkyHF2003.pdf?sequence=1>>, In Human Factors, vol. 45, No. 2, Retrieved Date: Nov. 29, 2012, pp. 53.
Strasburger, et al., "Peripheral Vision and Pattern Recognition: A Review", Retrieved at <<http://hans-strasburger.userweb.mwn.de/reprints/peripheral_vision_review.pdf>>, In Journal of Vision, vol. 11, No. 5, Dec. 28, 2011, pp. 130.
Watson, et al., "Managing Level of Detail through Peripheral Degradation: Effects on Search Performance with a Head-Mounted Display", Retrieved at <<http://koolhaas.csc.ncsu.edu/pages/docs/

(56) References Cited

OTHER PUBLICATIONS tochi.pdf>>, In ACM Transactions on Computer-Human Interaction, vol. 4, Issue 4, Dec. 1997, Pages //koolhaas.csc.ncsu.edu/pages/docs/tochi.pdf.

Watson, et al., "Supra-Threshold Control of Peripheral LOD", Retrieved at <<http://152.14.92.33/pages/docs/sig04.suprathreshold.pdf>>, In ACM Transactions on Graphics—Proceedings of ACM SIGGRAPH, vol. 23, Issue 3, Aug. 2004, pp. 10.

Weaver, Kimberly Ann., "Design and Evaluation of a Perceptually Adaptive Rendering System for Immersive Virtual Reality Environments", Retrieved at <<http://www.vrac.iastate.edu/news-files/d/6/d64e37fca2482293adee2f7fe17fdd8343da205d4243fe0775eb619a/1449653.pdf>>, A Thesis Submitted to the Graduate Faculty in Partial Fulfillment of the Requirements for the Degree of Master of Science, Retrieved Date: Nov. 29, 2012, pp. 158.

Yee, et al., "Spatiotemporal Sensitivity and Visual Attention for Efficient Rendering of Dynamic Environments", Retrieved at <<http://www.eq.ccu.edu.tw/files/p39-yee.pdf>>, In ACM Transactions on Graphics, vol. 20, Issue 1, Jan. 2001, pp. 27.

\* cited by examiner

FOVEATED IMAGE RENDERING

BACKGROUND

The human visual system can perceive 135° vertically and 160° horizontally, but can perceive fine detail only within about a 5° central circle. Outside this visual field, resolving power falls dramatically. Because the human eye can be redirected quickly to a point of interest, people are rarely aware of the fact that most of the visual field is a blur. However, according to current computer graphics techniques, every region of an image is rendered at equal resolution because the viewer's gaze is unknown. This is wasteful because computer graphics processing is computationally expensive.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

An embodiment provides a method for foveated image rendering. The method includes tracking a gaze point of a user on a display device and generating a specified number of eccentricity layers based on the gaze point of the user. The method also includes antialiasing the eccentricity layers to remove artifacts, rendering a foveated image based on the eccentricity layers, and displaying the foveated image to the user via the display device.

Another embodiment provides a foveated image rendering system. The foveated image rendering system includes a display device, an eye tracking device, a processor that is adapted to execute stored instructions, and a system memory. The system memory includes code configured to track a gaze point of a user on the display device via the eye tracker and generate a specified number of eccentricity layers based on the gaze point of the user. The system memory also includes code configured to antialias the eccentricity layers to remove artifacts and send the gaze point of the user and the eccentricity layers to the display device. The display device is configured to render a foveated image based on the eccentricity layers and display the foveated image to the user via the display device.

In addition, another embodiment provides one or more computer-readable storage media for storing computer-readable instructions. The computer-readable instructions provide a foveated image rendering system when executed by one or more processing devices. The computer-readable instructions include code configured to track a gaze point of a user on a display device and generate a number of eccentricity layers. The eccentricity layers are nested and are centered on the gaze point of the user. The computer-readable instructions also include code configured to antialias the eccentricity layers to remove artifacts and render a foveated image by smoothly blending the eccentricity layers and interpolating the eccentricity layers to a native resolution of the display device. The computer-readable instructions further include code configured to display the foveated image to the user via the display device.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

As discussed above, the human visual system perceives fine detail only within about a 5° central circle. This tiny portion of the visual field projects to the retinal region referred to as the fovea, which is tightly packed with color cone receptors. The angular distance away from the central gaze direction is referred to as the "eccentricity." Acuity falls off rapidly as eccentricity increases due to reduced receptor and ganglion density in the retina, reduced optical nerve bandwidth, and reduced processing devoted to the periphery in the visual cortex. As used herein, the term "foveation" refers to the decrease in acuity that occurs with the increase in eccentricity in the human visual system.

Current computer graphics techniques ignore the gaze of the user and render a high-resolution image over an entire display device. However, this is tremendously wasteful of power and computing resources, since the 5° foveal region fills a mere 0.8% of the solid angle of a 60° display. Therefore, embodiments described herein provide a system and method for foveated image rendering that may be used in conjunction with computer graphics applications. Specifically, embodiments described herein provide for tracking the gaze of a user and adjusting the resolution and geometric level of detail of an image based on the eccentricity. According to such embodiments, unperceived detail can be omitted from an image, resulting in significant savings in terms of power and computing resources.

Many current techniques attempt to exploit foveation in computer graphics. However, such techniques have not been applied to general-purpose, hardware-assisted, three-dimensional computer graphics applications. Furthermore, such techniques fail to account for aliasing in the periphery of images, as well as system latency. As used herein, the term "aliasing" refers to distortions or artifacts that occur when a high-resolution image is rendered at a lower resolution. In addition, as used herein, the term "latency" refers to the time elapsed between capturing the position of the user's gaze and displaying the corresponding foveated image. Embodiments described herein provide for anti-aliasing and a reduction in the system latency during the rendering of a foveated image. In various embodiments, anti-aliasing is accomplished using a combined approach of multi-sample antialiasing (MSAA), temporal reverse reprojection, and temporal jitter of the spatial sampling grid, as discussed further below.

In addition, embodiments described herein exploit foveation on existing graphics hardware by rendering a number of nested and overlapping render targets, or "eccentricity layers," centered on the current gaze point of the user. The inner eccentricity layer is smallest in angular diameter but is rendered at the highest resolution and finest level of detail, while the outer layer is largest in angular diameter but is rendered at the lowest resolution and coarsest level of detail. According to embodiments described herein, the eccentricity layers are interpolated to native display resolution and smoothly blended to produce the foveated image.

Figure 1:
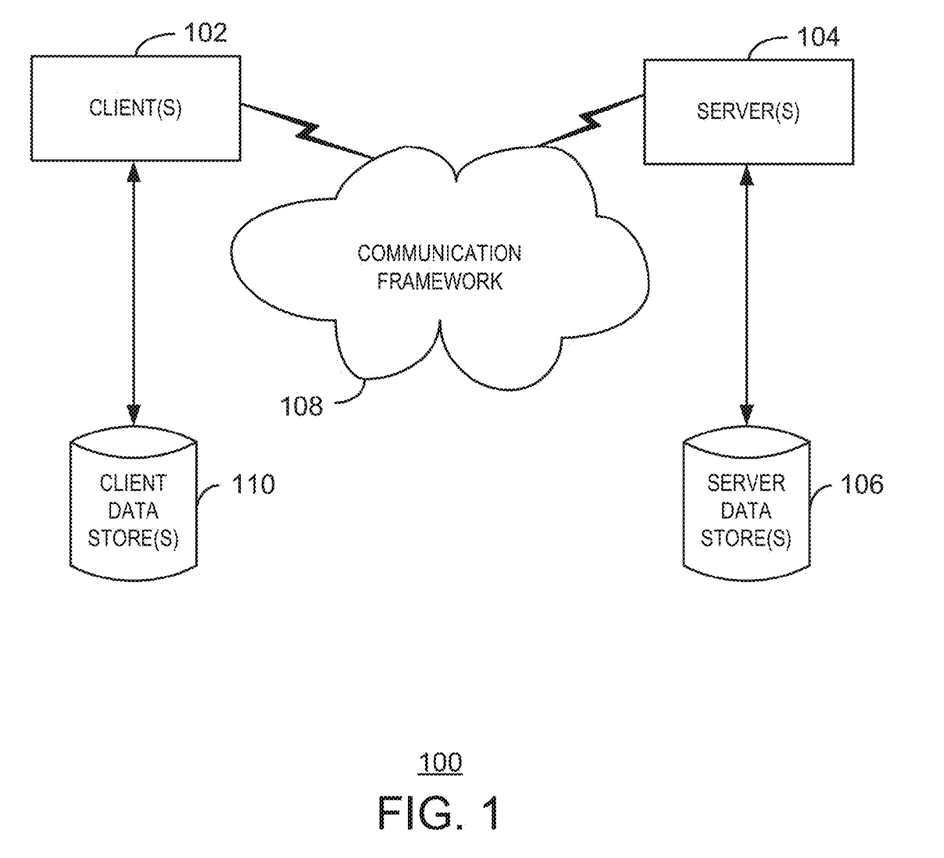
FIG. 1 is a block diagram of a networking environment in which a system and method for foveated image rendering may be implemented.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As used herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device, or media.

As used herein, terms "component," "search engine," "browser," "server," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Figure 2:
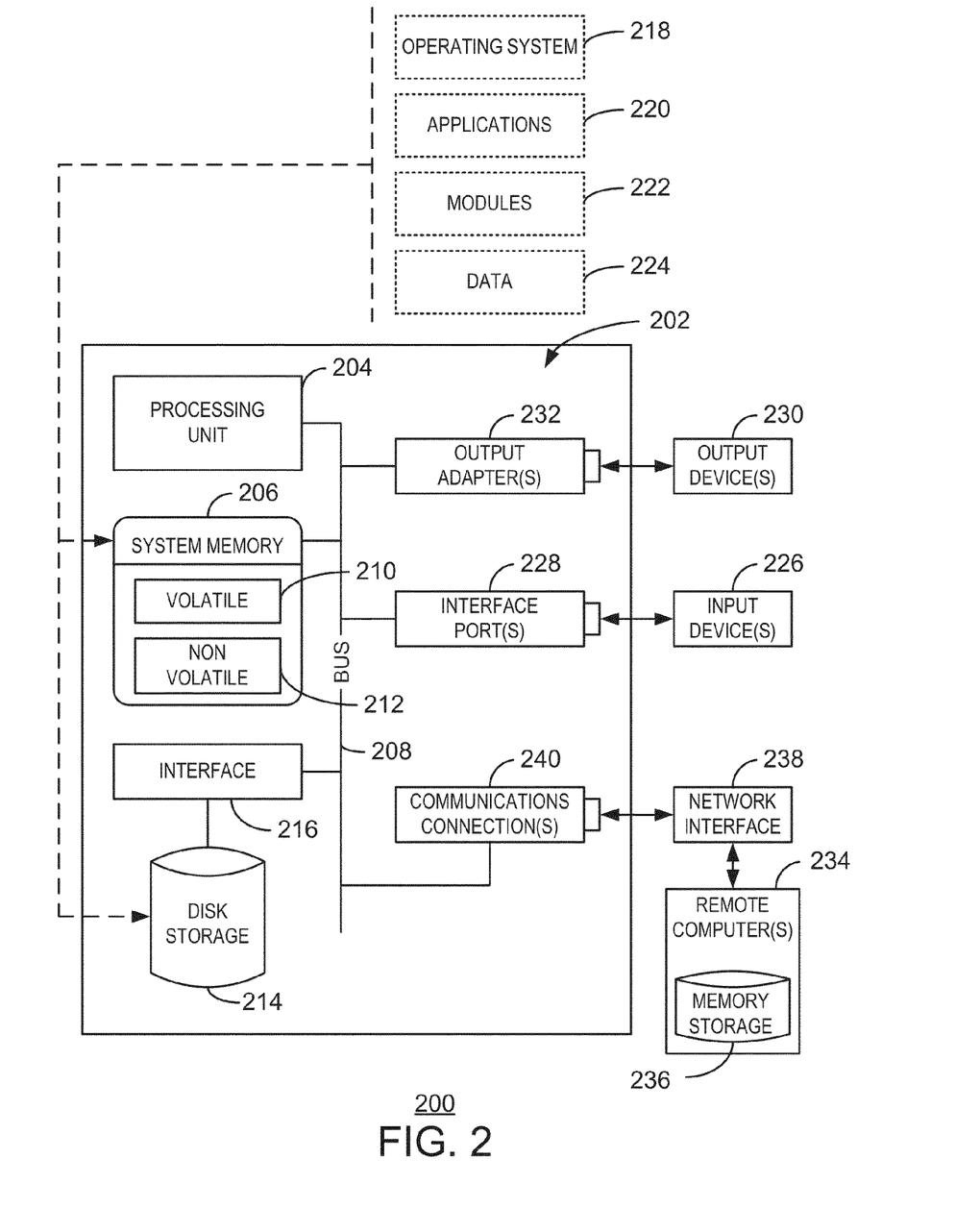
FIG. 2 is a block diagram of a computing environment that may be used to implement a system and method for foveated image rendering.

In order to provide context for implementing various aspects of the claimed subject matter, FIGS. 1-2 and the following discussion are intended to provide a brief, general description of a computing environment in which the various aspects of the subject innovation may be implemented. For example, a method and system for foveated image rendering can be implemented in such a computing environment. While the claimed subject matter has been described above in the general context of computer-executable instructions of a computer program that runs on a local computer or remote computer, those of skill in the art will recognize that the subject innovation also may be implemented in combination with other program modules. Generally, program modules include routines, programs, components, data structures, etc., that perform particular tasks or implement particular abstract data types.

Moreover, those of skill in the art will appreciate that the subject innovation may be practiced with other computer system configurations, including single-processor or multi-processor computer systems, minicomputers, mainframe computers, as well as personal computers, hand-held computing devices, microprocessor-based or programmable consumer electronics, and the like, each of which may operatively communicate with one or more associated devices. The illustrated aspects of the claimed subject matter may also be practiced in distributed computing environments wherein certain tasks are performed by remote processing devices that are linked through a communications network. However, some, if not all, aspects of the subject innovation may be practiced on stand-alone computers. In a distributed computing environment, program modules may be located in local or remote memory storage devices.

FIG. 1 is a block diagram of a networking environment 100 in which a system and method for foveated image rendering may be implemented. The networking environment 100 includes one or more client(s) 102. The client(s) 102 can be hardware and/or software (e.g., threads, processes, or computing devices). The networking environment 100 also includes one or more server(s) 104. The server(s) 104 can be hardware and/or software (e.g., threads, processes, or computing devices). The servers 104 can house threads to perform search operations by employing the subject innovation, for example.

One possible communication between a client 102 and a server 104 can be in the form of a data packet adapted to be transmitted between two or more computer processes. The networking environment 100 includes a communication framework 108 that can be employed to facilitate communications between the client(s) 102 and the server(s) 104. The client(s) 102 are operably connected to one or more client data store(s) 110 that can be employed to store information local to the client(s) 102. The client data store(s) 110 may be stored in the client(s) 102, or may be located remotely, such as in a cloud server. Similarly, the server(s) 104 are operably connected to one or more server data store(s) 106 that can be employed to store information local to the servers 104.

FIG. 2 is a block diagram of a computing environment 200 that may be used to implement a system and method for foveated image rendering. The computing environment 200 includes a computer 202. The computer 202 includes a processing unit 204, a system memory 206, and a system bus 208. The system bus 208 couples system components including, but not limited to, the system memory 206 to the processing unit 204. The processing unit 204 can be any of various available processors. Dual microprocessors and other multiprocessor architectures also can be employed as the processing unit 204.

Further, in various embodiments, the processing unit 204 includes a graphics processing unit (GPU). The computing environment 200 may also include any number of other computer graphics hardware components, computer graphics firmware components, and/or computer graphics software components for executing computer graphics tasks.

The system bus 208 can be any of several types of bus structures, including the memory bus or memory controller, a peripheral bus or external bus, or a local bus using any variety of available bus architectures known to those of ordinary skill in the art. The system memory 206 is computer-readable storage media that includes volatile memory 210 and non-volatile memory 212. The basic input/output system (BIOS), containing the basic routines to transfer information between elements within the computer 202, such as during start-up, is stored in non-volatile memory 212. By way of illustration, and not limitation, non-volatile memory 212 can include read-only memory (ROM), programmable ROM (PROM), electrically-programmable ROM (EPROM), electrically-erasable programmable ROM (EEPROM), or flash memory.

Volatile memory 210 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 202 also includes other computer-readable storage media, such as removable/non-removable, volatile/non-volatile computer storage media. FIG. 2 shows, for example, a disk storage 214. Disk storage 214 includes, but is not limited to, devices like a magnetic disk drive, floppy disk drive, tape drive, Jaz drive, Zip drive, LS-100 drive, flash memory card, or memory stick.

In addition, disk storage 214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 214 to the system bus 208, a removable or non-removable interface is typically used, such as interface 216.

It is to be appreciated that FIG. 2 describes software that acts as an intermediary between users and the basic computer resources described in the computing environment 200. Such software includes an operating system 218. The operating system 218, which can be stored on disk storage 214, acts to control and allocate resources of the computer 202.

System applications 220 take advantage of the management of resources by the operating system 218 through program modules 222 and program data 224 stored either in system memory 206 or on disk storage 214. It is to be appreciated that the claimed subject matter can be implemented with various operating systems or combinations of operating systems.

A user enters commands or information into the computer 202 through input devices 226. Input devices 226 include, but are not limited to, a pointing device (such as a mouse, trackball, stylus, or the like), a keyboard, a microphone, a gesture or touch input device, a voice input device, a joystick, a satellite dish, a scanner, a TV tuner card, a digital camera, a digital video camera, a web camera, or the like. The input devices 226 connect to the processing unit 204 through the system bus 208 via interface port(s) 228. Interface port(s) 228 include, for example, a serial port, a parallel port, a game port, and a universal serial bus (USB). Output device(s) 230 may also use the same types of ports as input device(s) 226. Thus, for example, a USB port may be used to provide input to the computer 202 and to output information from the computer 202 to an output device 230.

An output adapter 232 is provided to illustrate that there are some output devices 230 like monitors, speakers, and printers, among other output devices 230, which are accessible via the output adapters 232. The output adapters 232 include, by way of illustration and not limitation, video and sound cards that provide a means of connection between the output device 230 and the system bus 208. It can be noted that other devices and/or systems of devices provide both input and output capabilities, such as remote computer(s) 234.

The computer 202 can be a server hosting an event forecasting system in a networking environment, such as the networking environment 100, using logical connections to one or more remote computers, such as remote computer(s) 234. The remote computer(s) 234 may be client systems configured with web browsers, PC applications, mobile phone applications, and the like. The remote computer(s) 234 can be a personal computer, a server, a router, a network PC, a workstation, a microprocessor based appliance, a mobile phone, a peer device or other common network node and the like, and typically includes many or all of the elements described relative to the computer 202. For purposes of brevity, the remote computer(s) 234 is illustrated with a memory storage device 236. Remote computer(s) 234 is logically connected to the computer 202 through a network interface 238 and then physically connected via a communication connection 240.

Network interface 238 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 240 refers to the hardware/software employed to connect the network interface 238 to the system bus 208. While communication connection 240 is shown for illustrative clarity inside computer 202, it can also be external to the computer 202. The hardware/software for connection to the network interface 238 may include, for example, internal and external technologies such as mobile phone switches, modems including regular telephone grade modems, cable modems and DSL modems, ISDN adapters, and Ethernet cards.

Figure 3:
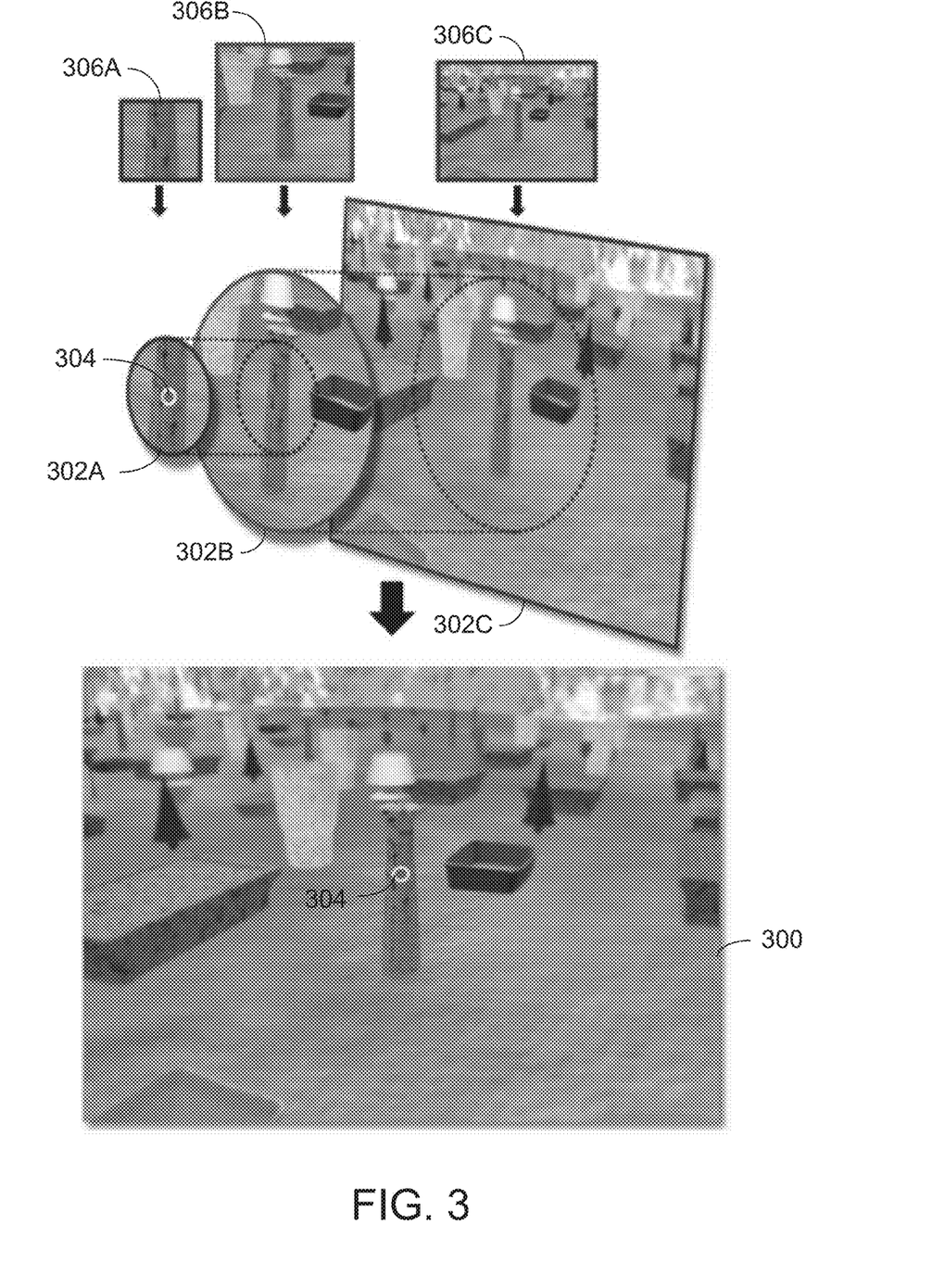
FIG. 3 is a schematic showing a foveated image that is rendered using three eccentricity layers.

FIG. 3 is a schematic showing a foveated image 300 that is rendered using three eccentricity layers 302A-C. The eccentricity layers 302A-C are centered on a tracked gaze point 304 of a user. An inner eccentricity layer 302A is smallest in angular diameter but is rendered at the highest resolution and the finest level of detail. A middle eccentricity layer 302B is larger in angular diameter but is rendered at a lower resolution and coarser level of detail. An outer eccentricity layer 302C is largest in angular diameter but is rendered at the lowest resolution and coarsest level of detail. A top row of the schematic of FIG. 3 shows the correct relative sizes 306A-C of the three eccentricity layers 302A-C. The middle and outer eccentricity layers 302B and 302C may be updated at half the temporal rate of the inner eccentricity layer 302A. In various embodiments, the three eccentricity layers 302A-C are interpolated to native display resolution and smoothly composited to yield the foveated image 300 shown in FIG. 3.

The manner in which visual acuity falls off in the periphery of the visual field may be expressed as a linear model. When measured in terms of a minimum angle of resolution (MAR), rather than its reciprocal, acuity, a linear model matches both anatomical data, e.g., receptor density, and performance results on many low-level vision tasks. Acuity models form the basis for the well-known theory of cortical magnification, or M-scaling, which posits that enlarging a visual stimulus minimizes performance variation as it becomes increasingly peripheral. A linear model is also typically used in this theory. The linear model is based on the reciprocal of visual cortex tissue volume devoted to processing each slice of eccentricity.

Given a fixed contrast ratio supported by a particular display, the linear model defined in Eq. (1) may be assumed.

$$\omega = me + \omega_0 \tag{1}$$

In Eq. (1), $\omega$ is the MAR in degrees per cycle, e is the eccentricity angle, $\omega_0$ is the smallest resolvable angle and represents the reciprocal of visual acuity at the fovea (e=0), and m is the MAR slope. This linear model yields the expected hyperbolic falloff of acuity with eccentricity, where acuity is measured as a minimum resolvable angular frequency; i.e., $f=1/\omega$, as discussed further with respect to FIG. 4.

Figure 4:
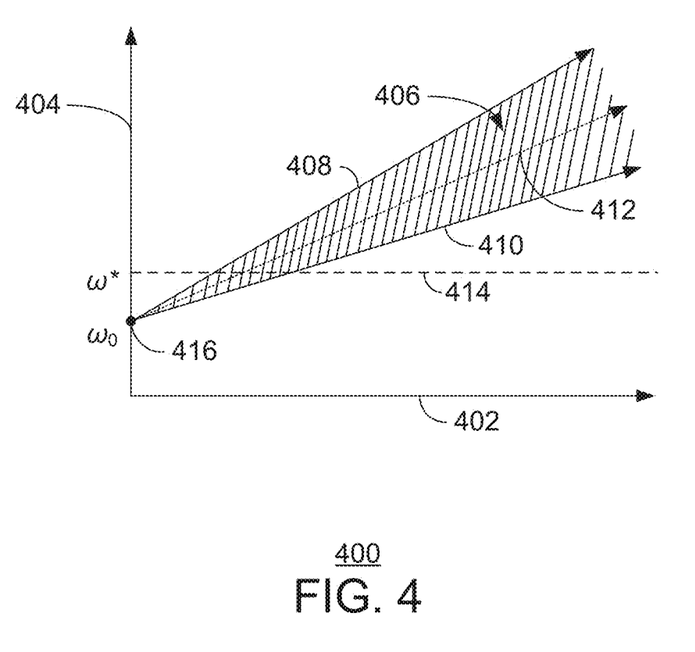
FIG. 4 is a graph showing the manner in which acuity decreases as eccentricity increases.

FIG. 4 is a graph 400 showing the manner in which acuity decreases as eccentricity increases. An x-axis 402 of the graph 400 represents the eccentricity angle, and a y-axis 404 of the graph 400 represents the MAR in degrees per cycle. A linear model in terms of the reciprocal of acuity, or MAR, matches anatomical data and performance-based studies. A shaded area 406 of the graph 400 represents the "zone of aliasing" in the human visual system. Above a line 408 indicating the upper limit of the zone of aliasing, angular size is resolvable everywhere in the periphery (also termed "resolution acuity"). Below a line 410 indicating the lower limit of the zone of aliasing, details become invisible (also termed "detection acuity"). It may be desirable to find a line 412 between these two limits that preserves some visible but aliased detail in the periphery, and also provides good savings in foveated rendering.

In the graph 400, a horizontal line 414 at a MAR of w* denotes the display's sharpness angle, i.e., the angle subtended by two pixels given the display's width and the user's viewing distance. For typical desktop display configurations, the display's sharpness angle is larger, i.e., less detailed, than the smallest angle perceivable at the fovea, $\omega_0$ 416.

In the fovea, receptor density is matched to the eye's optics. In the periphery, receptors become increasingly sparse relative to the eye's optical system Nyquist limit. As discussed above, there is a zone of aliasing in peripheral vision where small angular sizes, i.e., high frequencies, are irregularly detectable but not uniformly resolvable. It may be desirable to find a falloff slope m within the zone of aliasing that provides a comfortable balance between suppressing aliasing and preserving visible but aliased frequencies in the periphery. Targeting a higher slope improves savings from foveated rendering because eccentricity layer resolution can fall off more rapidly.

Foveal acuity in healthy, non-elderly adults with corrected vision substantially exceeds the 20/20 Snellen chart standard, which equals 30 cycles per degree. It generally does not exceed 20/10=60 cycles per degree. An estimate of the average foveal acuity for healthy eyes is between 20/16 and 20/12, which corresponds to around 48 cycles per degree. Therefore, according to embodiments described herein, the representative value $\omega_0=1/48$ may be used.

It may be assumed that there is uncertainty in the choice of an optimal MAR slope m because of the aliasing that occurs in the periphery of the human visual system. Therefore, the value of $\omega_0$ may be fixed, and a value of m that provides sufficient quality in actual experiments with users may be found.

Figure 5:
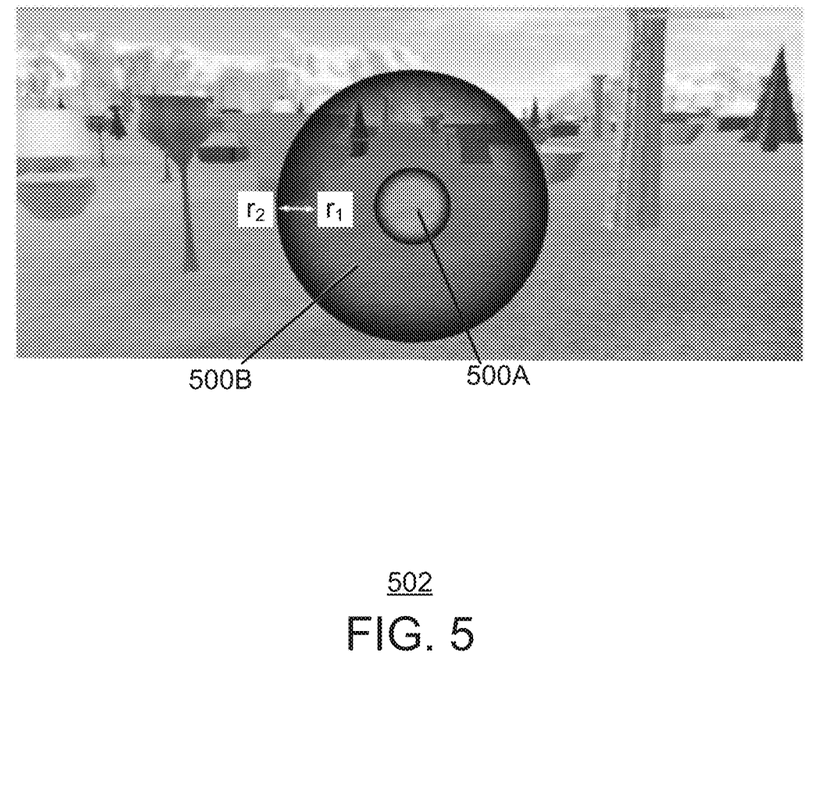
FIG. 5 is a schematic showing elliptical blend masks for blending three eccentricity layers to render a foveated image.

FIG. 5 is a schematic showing elliptical blend masks 500A and 500B for blending three eccentricity layers to render a foveated image 502. An inner elliptical blend mask 500A is used to blend the inner eccentricity layer and the middle eccentricity layer. An outer elliptical blend mask 500B is used to blend the middle eccentricity layer and the outer eccentricity layer.

The darkness of the elliptical blend masks 500A and 500B corresponds to the blend weight, where black is equal to a blend weight of 0 and clear is equal to a blend weight of 1. As shown in FIG. 5, at a radius of $r_1$ in the outer elliptical blend mask 500B, the blend weight is 1 for the middle eccentricity layer and 0 for the outer eccentricity layer. At a radius of $r_2$ in the outer elliptical blend mask 500B, the blend weight is 0 for the middle eccentricity layer and 1 for the outer eccentricity layer. Between these radii, the blend weight follows the smoothstep function, which is a cubic with zero derivatives at the endpoints. Beyond a radius of $r_2$, only the outer eccentricity layer is visible. The inner eccentricity layer is similarly blended with the middle eccentricity layer using the inner elliptical blend mask 500B.

Figure 6:
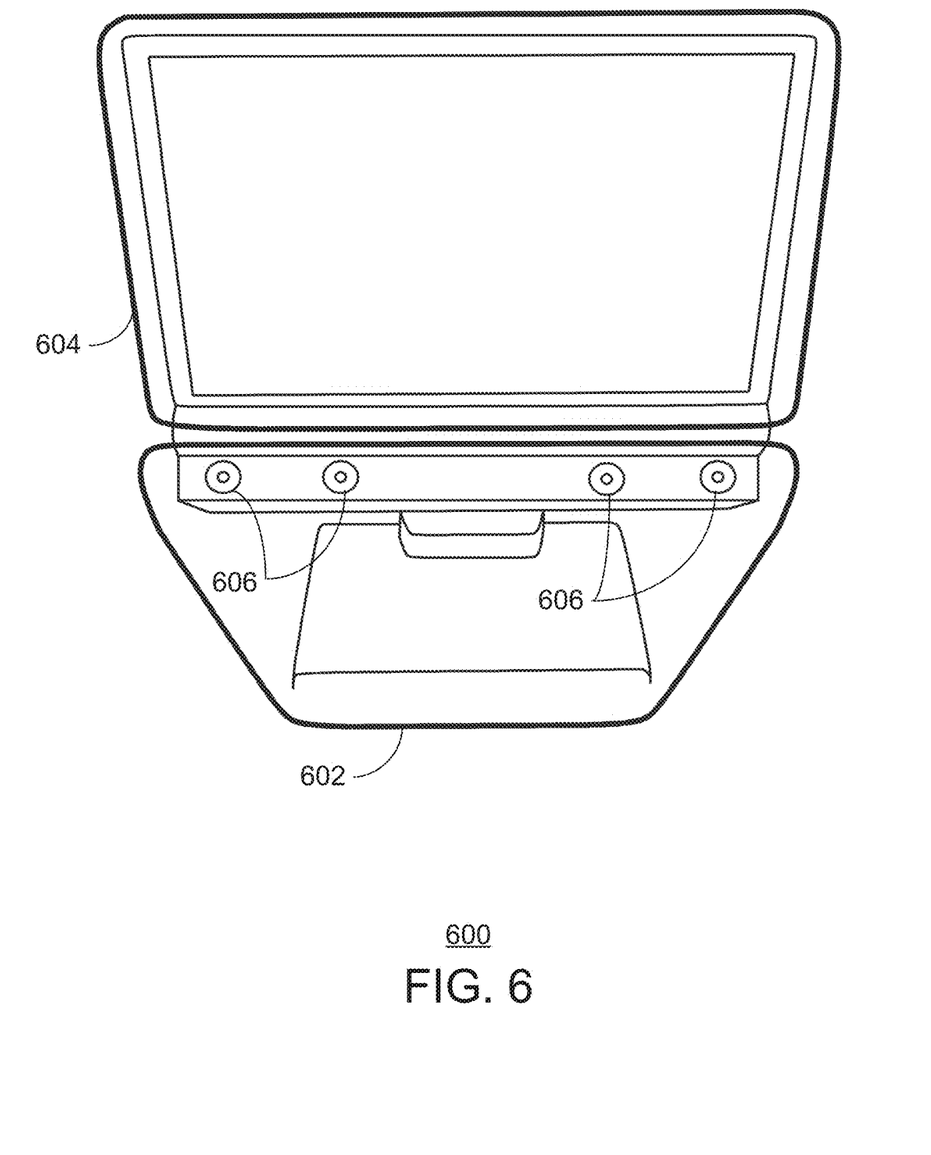
FIG. 6 is a schematic of an exemplary foveated image rendering system that may be used according to embodiments described herein.

FIG. 6 is a schematic of an exemplary foveated image rendering system 600 that may be used according to embodiments described herein. The foveated image rendering system 600 includes an eye tracker 602 and a personal computer (PC) including a high speed monitor 604, a central processing unit (CPU), and a graphics processing unit (GPU). The eye tracker 602 includes a number of infrared lights 606 for sensing a user's eye movements and, thus, tracking the gaze point of the user.

In various embodiments, the high speed monitor 604 is a specialized display device that dynamically adjusts physical eccentric resolutions for a number of eccentricity layers. Further, in various embodiments, the GPU is a specialized GPU that optimizes calculations for generating a number of eccentricity layers based on the gaze point of the user.

The eye tracker 602 may be communicably coupled to the PC, and may send information relating to the current gaze point of the user to the PC via an Ethernet connection, for example. The GPU of the PC may then render a foveated image based on the current gaze point of the user, and display the foveated image on the high speed monitor 604.

In some embodiments, the foveated image rendering system 600 is designed for asynchronous communication. Specifically, the interconnections between the eye tracker 602, the high speed monitor 604, the CPU, and the GPU may run asynchronously. In other embodiments, the foveated image rendering system 600 is designed for synchronous communication by providing tighter integration between the various hardware components of the foveated image rendering system 600, including the eye tracker 602, the high speed monitor 604, the CPU, and the GPU. The use of synchronous communication may allow the latency for the foveated image rendering system 600 to be reduced to a lowest possible level.

In various embodiments, if the latency for updating the foveated image on the high speed monitor 604 in response to a change in the user's gaze point is too high, the transition in the inner eccentricity layer of the foveated image from blurry to sharp may become visible to the user after rapid eye movement. Therefore, the high speed monitor 604 may update the inner eccentricity layer at a rate of around 120 hertz (Hz) to reduce the latency, and may update the middle and outer eccentricity layers at a rate of around 60 Hz. In some embodiments, the updating of the middle and outer eccentricity layers may be staggered by updating one on even frames and the other on odd frames. This may level out the computation and the frame rate. Furthermore, the eye tracker 602 may update the gaze point of the user at a rate of 300 Hz.

It is to be understood that the foveated image rendering system 600 of FIG. 6 is not limited to the components shown in FIG. 6. Rather, any number of components may be added, removed, or replaced within the foveated image rendering system 600 of FIG. 6, depending on the details of the specific implementation.

Measuring latency in a graphics system with eye tracking, such as the foveated image rendering system 600 of FIG. 6, is challenging because multiple devices are communicating asynchronously. Each component's latency may be measured independently, and asynchronous device interactions may be analyzed to find approximate highest and lowest overall latencies for the graphics system. The four main sources of latency within the graphics system are the eye tracker, the scene render time, the monitor scanout delay, and the pixel switching time.

The eye tracker may take about 1.3 milliseconds (ms) to 3.3 ms to process data and about 3.3 ms to capture a frame. Therefore, the lowest latency for the eye tracker may be around 7 ms, and the highest latency may be less than around 10 ms. The high speed monitor may update at a rate of 120 Hz, so scan out latency may be around 8 ms. Scene rendering may take around 8 ms at a refresh rate of 120 Hz. Based on these individual latencies, the possible asynchronous interleavings of events may be analyzed, and the highest and lowest latencies for updating the inner eccentricity layer may be determined. In various embodiments, it may be desirable to minimize the highest, or worst case, latency for updating the inner eccentricity layer, since delays in updating the inner eccentricity layer may greatly affect the viewing experience of the user. Further, in various embodiments, it may be desirable to minimize the worst case latency for the synchronized system in general by selecting specific components for the synchronized system based on the latency characteristics of each component.

According to the foveated image rendering techniques described herein, peripheral eccentricity layers may be sub-sampled by as much as a factor of 6 in each dimension. As a result, spatial aliasing in the peripheral eccentricity layers may occur, generating distracting temporal artifacts during scene motion. Aliasing in coherent artifacts, such as crawling along a sharp edge or thin highlight, may be particularly noticeable to the user.

A simple antialiasing technique involves increasing the sampling density for the image. However, such a technique would negate any performance improvement achieved from foveation of the image. Therefore, according to embodiments described herein, anti-aliasing is accomplished using a combined approach of multi-sample antialiasing (MSAA), temporal reverse reprojection, and temporal jittering of the spatial sampling grid. This antialiasing technique involves little extra computational cost and can be easily incorporated into existing applications. In various embodiments, MSAA increases effective resolution along silhouette edges, significantly reducing aliasing energy along the silhouette edges. In addition, whole frame jittering combined with temporal reprojection reduces the coherence and energy of aliasing throughout the image.

In various embodiments, an updated form of MSAA may be used to improve the performance of the temporal reverse reprojection procedure. According to the current form of MSAA, depth information is computed at the eccentricity layer resolution. However, according to the updated form of MSAA, geometric coverage and depth information may be computed at a higher resolution. Because only geometric information is computed, this is much cheaper than calling a pixel shader at higher resolution.

If the MSAA geometric coverage and depth information was accessible then we could get much more accurate reprojection, without significantly increasing computation. This would require hardware that would store the extra information and execute our reprojection in a separate pass.

According to the antialiasing technique described herein, each eccentricity layer has its own sampling grid. A sampling grid of the inner eccentricity layer coincides with a sampling grid of the native display, but the sampling grids of the other eccentricity layers do not. For every frame, each eccentricity layer is jittered by ±0.5 of its pixel pitch. Alternatively, in some embodiments, improved results are obtained by jittering per pixel, rather than per eccentricity layer. The eccentricity layer's current pixel values are blended with their temporally reprojected value from the previous frame to increase the effective sampling. Finally, the layer is resampled to the native display sampling grid using bilinear interpolation.

Eccentricity layers are nested and overlap around the gaze point of the user, as shown in FIG. 3. A few discrete eccentricity layers approximate the smooth falloff of frequency sensitivity with angular eccentricity in the human visual system. More eccentricity layers improve the approximation but also add rendering and memory overhead. Embodiments are described herein with respect to the use of three eccentricity layers. However, it is to be understood that any suitable number of eccentricity layers may be used, depending on the details of the specific implementation. For example, more eccentricity layers may be used to increase the efficiency at higher display resolution.

In various embodiments, the angular sizes and resolutions for the eccentricity layers may be determined based on the details of each specific implementation of the foveated image rendering techniques described herein. Specifically, for a given acuity falloff line, the eccentricity layer angular sizes that support a certain resolution at every eccentricity, as well as minimize the total number of pixels across all eccentricity layers, may be found.

Given an acuity falloff based on a slope m from Eq. (1), and the display's configuration parameters (i.e., horizontal resolution $D^*$, width $W^*$, distance from viewer $V^*$, and aspect ratio $\alpha^* \leq 1$), a simple optimization procedure may be invoked to select the size and sampling rate for each eccentricity layer. Assume that there are n eccentricity layers, and each eccentricity layer is denoted by $L_i$, where i=1 indexes the inner eccentricity layer and i=n indexes the outer eccentricity layer. A corresponding angular radius $e_i$ and sampling rate (pixel size) $s_i \geq 1$ are represented as a multiple of the (unit) pixel size of the native display.

The inner eccentricity layer uses the native display's sampling rate, i.e., $s_1=1$. It is assumed that the native display resolution cannot be exceeded, even though it may not match human foveal acuity at the desired viewing distance, $V^*$. The outer eccentricity layer is not a square image centered about the user's gaze point like the other eccentricity layers. Instead, the outer eccentricity layer subsamples the entire screen image and preserves the display's aspect ratio. In various embodiments, the eccentricity layer parameters are chosen to provide a piecewise-constant approximation to the MAR line targeted.

Figure 7:
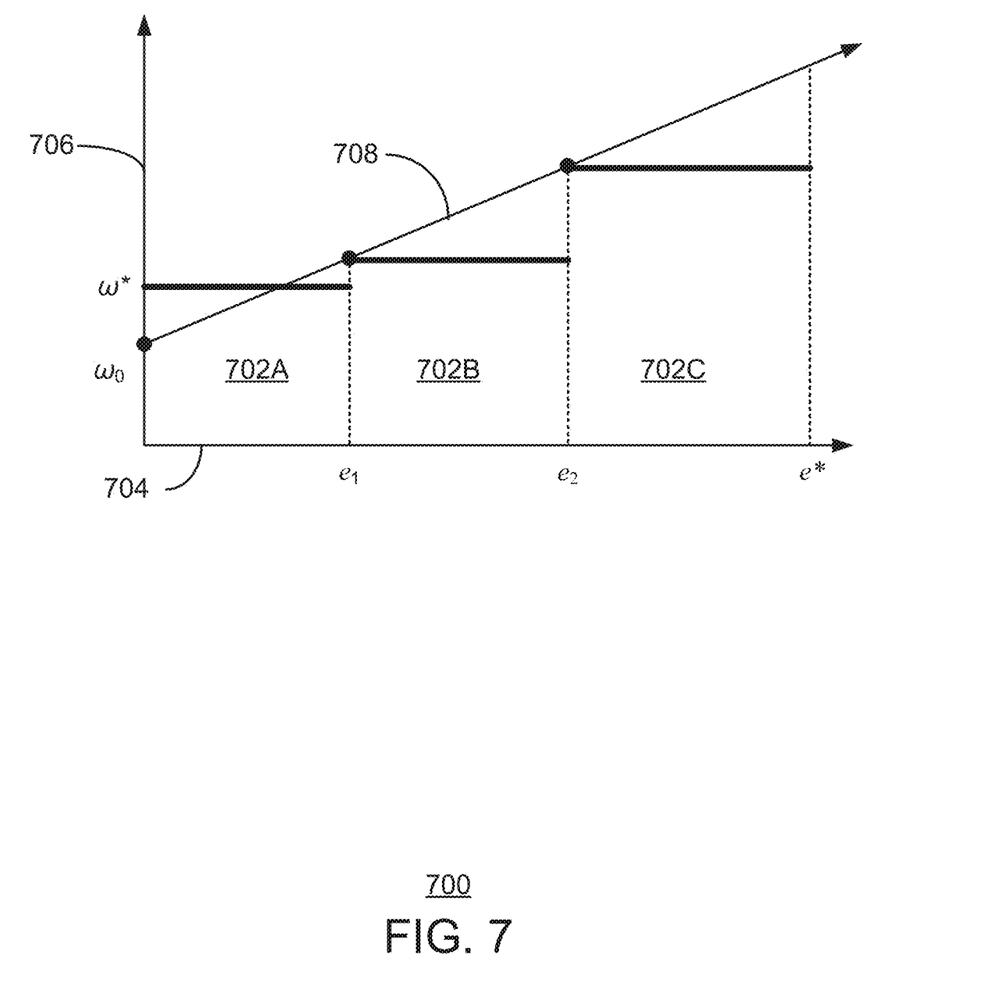
FIG. 7 is a graph showing parameter selection for three eccentricity layers.

Under these assumptions, choosing any set of progressively increasing layer radii $e_i$ determines the corresponding layer sampling factors $s_i$, as shown in FIG. 7. Each layer is sampled at the smallest MAR at which it appears on the display screen, corresponding to the eccentricity just outside the previous eccentricity layer's angular extent. The appropriate computation is given by $s_1=1$ and Eq. (2).

$$s_{i+1} = \frac{\omega_i}{\omega^*} = \frac{me_i + \omega_0}{\omega^*} \tag{2}$$

Eq. (2) may be computed for $i \in [1, n-1]$. As discussed above, $\omega^*$ represents the display's sharpness angle in terms of degrees per cycle, where one cycle equals two pixels. The horizontal size/diameter $D_i$ of each eccentricity layer in pixels can be computed from its angular radius $e_i$ and sampling factor $s_i$ according to Eq. (3).

$$D_i = \begin{cases} 2\frac{D^*}{s_i}\tan(e_i)\frac{V^*}{W^*}, & 1 \leq i < n \\ \frac{D^*}{s_i}, & i = n \end{cases} \tag{3}$$

The rendering work performed for each eccentricity layer can then be estimated by the number of pixels the eccentricity layer contains, as shown below in Eq. (4).

$$P_i = \begin{cases} (D_i)^2, & 1 \leq i < n \\ \alpha^*(D_i)^2, & i = n \end{cases} \tag{4}$$

The total amount of work may be defined according to Eq. (5).

$$P = \Sigma_{i=1}^n w_i P_i \tag{5}$$

In various embodiments, the total amount of work may be minimized as a function of the n−1 optimization variables $e_1, e_2, \ldots, e_{n-1}$. Brute force minimization may be performed by discretizing the display's angular extent, $e^*$, and testing the objective at each point $0 < e_1 < e_2 < \ldots < e_{n-1} < e^*$. The term $w_i$ may be set to 1.

The display's angular radius may be calculated from the basic configuration parameters, as shown below in Eq. (6).

$$e^* = \tan^{-1}\left(\frac{W^*}{2V^*}\right) \tag{6}$$

In addition, the display's sharpness angle may be calculated according to Eq. (7).

$$\omega^* = \tan^{-1}\left(\frac{2W^*}{V^*D^*}\right) \tag{7}$$

To evaluate potential speedup, estimated rendering work P may be compared to the total number of display pixels, as shown below in Eq. (8).

$$P^* = \alpha^*(D^*)^2 \tag{8}$$

In some embodiments, the weights in Eq. (5) can be adjusted, e.g., $w_1=1$ and $w_i=1/2$, $i>1$. This accounts for the fact that the inner eccentricity layer is updated twice as often as the outer eccentricity layers and is, thus, twice as expensive.

FIG. 7 is a graph 700 showing parameter selection for three eccentricity layers 702A-C. Specifically, the graph 700 shows parameter selection for an inner eccentricity layer 702A, a middle eccentricity layer 702B, and an outer eccentricity layer 702C. An x-axis 704 of the graph 700 represents an angular radius, and a y-axis 706 of the graph represents a sharpness angle.

As shown in FIG. 7, a particular acuity falloff to target is indicated in terms of a MAR line 708 with slope m. Optimization over the angular radii, $e_1$ and $e_2$, may be performed to minimize the sum of the pixels in all three eccentricity layers 702A-C. Further, as shown in FIG. 7, the inner eccentricity layer 702A is sampled at the smallest MAR the display supports, w*.

Figure 8:
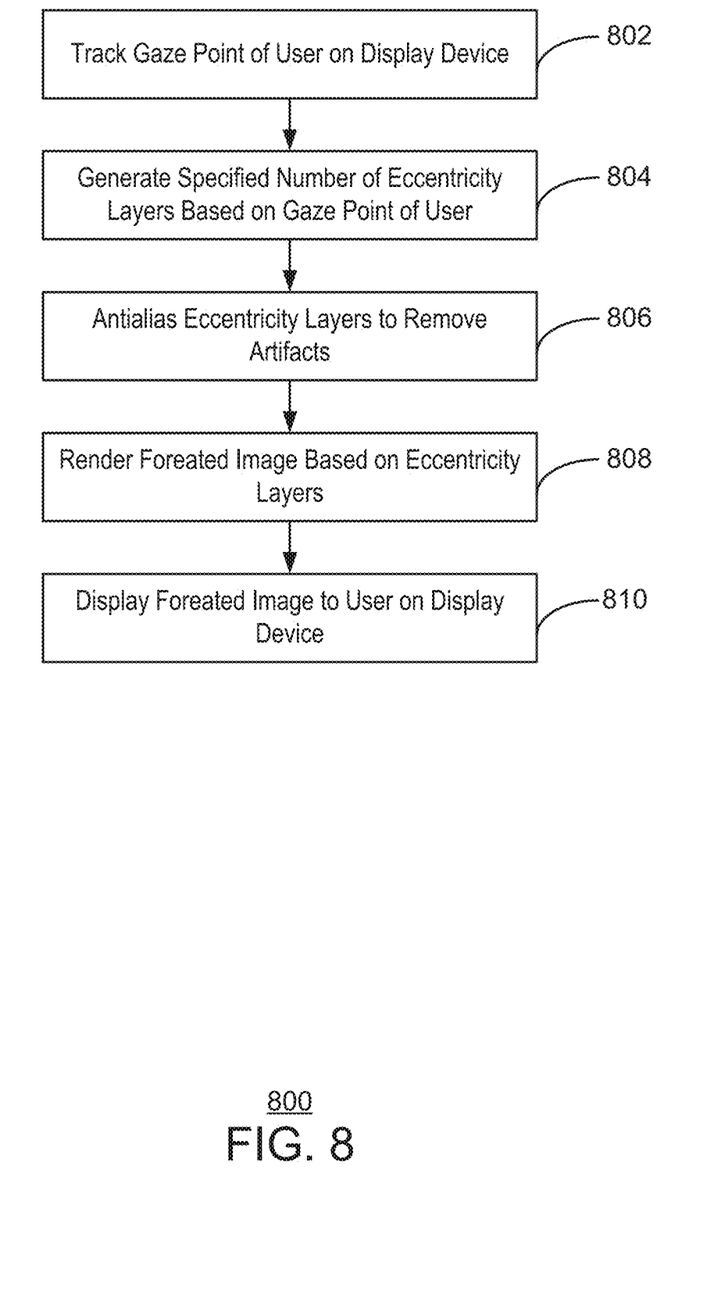
FIG. 8 is a process flow diagram of a method for foveated image rendering.

FIG. 8 is a process flow diagram of a method 800 for foveated image rendering. In various embodiments, the method 800 is used to render foveated images for a general-purpose, hardware-assisted, three-dimensional computer graphics application. However, the method 800 is not limited to three-dimensional computer graphics applications. Rather, the method 800 may be used to render foveated images for any suitable type of two-dimensional or three-dimensional computer graphics application. The method 800 may be implemented within the networking environment 100 of FIG. 1 and/or the computing environment 200 of FIG. 2. Further, the method 800 may be implemented by the foveated image rendering system 600 of FIG. 6, or by any suitable computing system including graphics hardware.

The method 800 begins at block 802, at which a gaze point of a user on a display device is tracked. In some embodiments, the gaze point of the user is tracked via an eye tracking device including a number of infrared lights. In various embodiments, the gaze point of the user is a point on a screen of the display device. However, the gaze point of the user may also be the user's gaze direction in general, or a gaze ray including the user's eye position and the view direction of the user.

At block 804, a specified number of eccentricity layers are generated based on the gaze point of the user. In various embodiments, for example, three eccentricity layers may be generated. The eccentricity layers may be nested and centered on the gaze point of the user. In addition, an angular size and a resolution for each eccentricity layer may be calculated via a visual acuity model. In various embodiments, an innermost eccentricity layer is smallest in angular size and is rendered at a resolution of the display device, and an outermost eccentricity layer is largest in angular size and is rendered at a lowest resolution. For example, the outermost eccentricity layer may subsample the entire screen of the display device and preserve an aspect ratio of the screen. In addition, in some embodiments, a level of detail for each eccentricity may be determined. The innermost eccentricity layer may have the finest level of detail, and the outermost eccentricity layer may have the coarsest level of detail. Further, in various embodiments, the innermost eccentricity layer is generated at a higher update rate than one or more outer eccentricity layers. For example, the inner eccentricity layers may be updated about twice as fast as the outer eccentricity layers.

In some embodiments, generating the eccentricity layers includes performing ray tracing with a continuous falloff of acuity to generate a large number of eccentricity layers, rather than a discrete set of eccentricity layers. For example, an eccentricity layer may be generated for every pixel in the image. Performing ray tracing with a continuous falloff of acuity may cause pixels that are closer to the gaze point of the user to be updated more frequently that those that are further away from the gaze point of the user.

At block 806, the eccentricity layers are antialiased to remove artifacts. This may be accomplished by performing multi-sample antialiasing, temporal reprojection, and per frame jittering or per pixel jittering for each eccentricity layer. In particular, the antialiasing technique may be performed for the eccentricity layers that are on the periphery of the image, e.g., the outermost eccentricity layers, since aliasing is strongest in those regions.

At block 808, the foveated image is rendered based on the eccentricity layers. Specifically, the eccentricity layers may be interpolated to native display resolution and smoothly blended to produce the foveated image. In some embodiments, the eccentricity layers are blended using elliptical blend masks, as discussed with respect to FIG. 5.

At block 810, the foveated image is displayed to the user via the display device. In various embodiments, the latency for rendering the foveated image and displaying the foveated image to the user via the display device is less than a specified upper threshold. The specified upper threshold represents a maximum latency at which the image still appears to the user to be in high resolution on the entire display device.

The process flow diagram of FIG. 8 is not intended to indicate that the blocks of the method 800 are to be executed in any particular order, or that all of the blocks are to be included in every case. Further, any number of additional blocks not shown in FIG. 8 may be included within the method 800, depending on the details of the specific implementation. For example, the gaze point of the user may be continuously tracked, and the foveated image may be updated as the gaze point of the user changes. Further, in some embodiments, a region of an eccentricity layer that is completely covered by a higher resolution eccentricity layer is not computed. This may result in significant reductions in cost and improvements in performance, particularly for implementations of the method 800 that include a large number of eccentricity layers.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for foveated image rendering, comprising:
   tracking a gaze point of a user on a display device;
   generating a specified number of eccentricity layers based on the gaze point of the user, wherein generating the specified number of eccentricity layers comprises alternately updating middle eccentricity layers and outer eccentricity layers;
   antialiasing the eccentricity layers to remove artifacts, wherein antialiasing comprises blending pixel values for each eccentricity layer with a temporally reprojected value from a previous frame;
   rendering a foveated image based on the eccentricity layers; and
   displaying the foveated image to the user via the display device.

2. The method of claim 1, comprising calculating an angular size and a resolution for each of the eccentricity layers via a visual acuity model.

3. The method of claim 2, wherein an inner eccentricity layer is smallest in angular size and is rendered at a resolution of the display device, and wherein an outer eccentricity layer is largest in angular size and is rendered at a lowest resolution.

4. The method of claim 1, wherein generating the specified number of eccentricity layers comprises generating an outermost eccentricity layer that subsamples the entire display device and preserves an aspect ratio of the display device.

5. The method of claim 1, comprising updating the foveated image as the gaze point of the user changes.

6. The method of claim 1, wherein generating the specified number of eccentricity layers comprises performing ray tracing with a continuous falloff of acuity to generate a plurality of eccentricity layers.

7. A foveated image rendering system, comprising:
a display device;
an eye tracking device;
a processor that is adapted to execute stored instructions; and
a system memory, wherein the system memory comprises code configured to:
track a gaze point of a user on the display device via the eye tracker;
generate a specified number of eccentricity layers based on the gaze point of the user, wherein generating the specified number of eccentricity layers comprises alternately updating middle eccentricity layers and outer eccentricity layers;
antialias the eccentricity layers to remove artifacts by blending pixel values for each eccentricity layer with a temporally reprojected value from a previous frame;
send the gaze point of the user and the eccentricity layers to the display device; and
wherein the display device is configured to:
render a foveated image based on the eccentricity layers; and
display the foveated image to the user via the display device.

8. The foveated image rendering system of claim 7, wherein the processor comprises a specialized graphics processing unit (GPU).

9. The foveated image rendering system of claim 7, wherein an outermost eccentricity layer subsamples the entire display device and preserves an aspect ratio of the display device.

10. The foveated image rendering system of claim 7, wherein the system memory comprises code configured to:
continuously track the gaze point of the user on the display device via the eye tracker; and
update the foveated image as the gaze point of the user changes.

11. The foveated image rendering system of claim 7, wherein the system memory comprises code configured to calculate an angular size and a resolution for each eccentricity layer via a visual acuity model.

12. The foveated image rendering system of claim 7, wherein the display device is configured to update an innermost eccentricity layer at a rate of 120 hertz.

13. The foveated image rendering system of claim 7, wherein the eye tracker is configured to update the gaze point of the user on the display device at a rate of 300 hertz.

14. The foveated image rendering system of claim 7, wherein the system memory comprises code configured to render the foveated image and display the foveated image to the user via the display device with a latency, based on the plurality of latency characteristics, that is lower than a specified upper threshold.

15. The foveated image rendering system of claim 7, wherein the system memory comprises code configured to generate the specified number of eccentricity layers by performing ray tracing with a continuous falloff of acuity to generate a plurality of eccentricity layers.

16. The foveated image rendering system of claim 7, wherein the system memory comprises code configured to render the foveated image by smoothly blending the eccentricity layers and interpolating the eccentricity layers to a native resolution of the display device.

17. The foveated image rendering system of claim 7, wherein the system memory comprises code configured to antialias the eccentricity layers by computing geometric coverage and depth information at a higher resolution than an eccentricity layer resolution.

\* \* \* \* \*